United States Patent
Schmogrow et al.

(10) Patent No.: US 10,454,587 B2
(45) Date of Patent: Oct. 22, 2019

(54) PARALLEL OPTICAL TRANSPONDER ENABLED BY OPTICAL COMB SOURCES

(71) Applicant: Google LLC, Mountain View, CA (US)

(72) Inventors: Rene Schmogrow, San Jose, CA (US); Vinayak Dangui, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/821,209

(22) Filed: Nov. 22, 2017

(65) Prior Publication Data

US 2019/0158186 A1     May 23, 2019

(51) Int. Cl.
| | |
|---|---|
| *H04B 10/61* | (2013.01) |
| *H04B 10/50* | (2013.01) |
| *G02F 1/225* | (2006.01) |
| *H04J 14/02* | (2006.01) |
| *G02F 1/21* | (2006.01) |

(52) U.S. Cl.
CPC ........... *H04B 10/506* (2013.01); *G02F 1/225* (2013.01); *H04B 10/61* (2013.01); *H04J 14/02* (2013.01); *G02F 2001/212* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,320,760 B1 * | 11/2012 | Lam | ...................... | H04J 14/002 398/66 |
| 2002/0159688 A1 * | 10/2002 | Kim | ....................... | H04J 14/02 385/24 |
| 2004/0018018 A1 * | 1/2004 | Izadpanah | ........... | F16K 37/0075 398/77 |
| 2004/0258420 A1 * | 12/2004 | Sayyah | ............ | H04B 10/25752 398/183 |
| 2008/0138088 A1 * | 6/2008 | Welch | ..................... | H01S 5/026 398/183 |
| 2010/0021166 A1 * | 1/2010 | Way | ........................ | H04J 14/02 398/79 |
| 2013/0108273 A1 * | 5/2013 | Valiveti | ................. | H04J 3/1652 398/79 |
| 2013/0202303 A1 | 8/2013 | Wilkinson et al. | | |

(Continued)

FOREIGN PATENT DOCUMENTS

EP     1267510 A2     12/2002

OTHER PUBLICATIONS

Bordonalli, Aldário Chrestani, et al. "Optical injection locking to optical frequency combs for superchannel coherent detection" Optics Express, vol. 23, No. 2, pp. 1547-1557, Jan. 26, 2015.

(Continued)

*Primary Examiner* — Omar S Ismail
(74) *Attorney, Agent, or Firm* — McDermott Will & Emery LLP (57) ABSTRACT

Parallel optical transponders with an optical comb source, and methods of using the same, are provided. The optical comb source can provide multiple optical carriers from a single source. The multiple optical carriers can be phase-aligned, which can allow joint processing of a received signal. The multiple optical carriers can also allow for modulating a demultiplexed data signal using multiple modulators rather than modulating the entire data signal using a single modulator.

21 Claims, 7 Drawing Sheets

(56) References Cited

U.S. PATENT DOCUMENTS

| | | | |
|---|---|---|---|
| 2014/0050476 A1* | 2/2014 | Grigoryan | H04B 10/2572 |
| | | | 398/65 |
| 2014/0205286 A1* | 7/2014 | Ji | H04B 10/40 |
| | | | 398/45 |
| 2017/0038609 A1* | 2/2017 | Luo | G02F 1/025 |
| 2017/0194310 A1* | 7/2017 | Evans | G02B 6/12004 |
| 2018/0054257 A1* | 2/2018 | Witzens | H04B 10/038 |

OTHER PUBLICATIONS

Lundberg, Lars. "Aspects of Power Consumption in Coherent Fiber-Optical Communication Systems" Thesis, Chalmers University of Technology, Gothenburg, Sweden, 2017.

Yi, Xingwen, et al. "Tb/s Coherent Optical OFDM Systems Enabled by Optical Frequency Combs", Journal od Lightwave Technology, vol. 28, No. 14, pp. 2054-2061, Jul. 15, 2010.

International Search Report and Written Opinion dated Mar. 25, 2019 in PCT Application No. PCT/US2018/061625.

\* cited by examiner

Generating an optical carrier signal including a plurality of optical carriers
having a plurality of respective wavelengths
710

Separating the optical carrier signal into its constituent optical carriers
720

Separating a combined optical data signal into a plurality of
optical component data signals
730

Extracting the an analog component data signal from each
optical component data signal
740

Converging the analog component data signals into a
plurality of respective digital component data signals
750

Jointly processing the digital component data signals into
a single data signal
760

FIG. 7

PARALLEL OPTICAL TRANSPONDER ENABLED BY OPTICAL COMB SOURCES

BACKGROUND

Optical transponders are widely deployed to form long-haul, metro, inter- and intra-datacenter networks carrying vast amounts of data traffic. With the advent of coherent optical communication technology, the amount of data transmitted per optical wavelength has increased tremendously. With the current generation of so-called line cards, line side data rates of up to 200 Gbit/s per optical carrier can be achieved. Next generation line cards may offer up to 600 Gbit/s per optical carrier. Increased data rates can reduce the number of optical components such as lasers, modulators, and photodiodes, thereby lowering the cost and power consumption of the system. Increases in digital signal processor speed and complexity (i.e., smaller semiconductor fabrication nodes) has helped enable an increase in per-carrier capacity. The analog bandwidth of the system does not scale with smaller nodes, however, and meeting analog domain performance requirements can increase the cost, size, and power consumption of the optical transponder.

SUMMARY

At least one aspect is directed to a parallel optical transmitter. The parallel optical transmitter includes an optical comb source configured to generate an optical carrier signal including a plurality of optical carriers having a plurality of respective wavelengths. The parallel optical transmitter includes a processor configured to receive a data signal and split it into a plurality of digital component data signals. The parallel optical transmitter includes a plurality of digital-to-analog convertors (DACs) configured to receive the digital component data signals and convert them into a plurality of respective analog component data signals. The parallel optical transmitter includes a demultiplexer configured to receive and separate the optical carrier signal into its constituent optical carriers. The parallel optical transmitter includes a photonic integrated circuit (PIC) including a plurality of modulators configured to modulate each analog component data signal onto a respective optical carrier to generate a respective optical component data signal. The parallel optical transmitter includes a multiplexer configured to receive and combine the optical component data signals into a combined optical data signal.

In some implementations, the PIC includes the demultiplexer and the multiplexer.

In some implementations, the plurality of optical carriers generated by the optical comb source are phase locked with respect to each other.

In some implementations, the processor includes the DACs, and the DACs in the processor directly drive their respective modulator.

In some implementations, the modulators are lumped Mach-Zehnder interferometers.

At least one aspect is directed to a method of transmitting an optical signal. The method includes generating, using an optical comb source, an optical carrier signal including a plurality of optical carriers having a plurality of respective wavelengths. The method includes splitting, using a processor, a received data signal into a plurality of digital component data signals. The method includes converting, using a plurality of digital-to-analog convertors (DACs), the digital component data signals into a plurality of respective analog component data signals. The method includes separating, using a demultiplexer, the optical carrier signal into its constituent optical carriers. The method includes modulating, using a plurality of modulators on a photonic integrated circuit (PIC), each analog component data signal onto a respective optical carrier to generate a respective optical component data signal. The method includes combining, using a multiplexer, the optical component data signals into a combined optical data signal.

In some implementations, the PIC includes the demultiplexer and the multiplexer.

In some implementations, the plurality of optical carriers generated by the optical comb source are phase locked with respect to each other.

In some implementations, the processor includes the DACs, and the DACs in the processor directly drive their respective modulator.

In some implementations, the modulators are lumped Mach-Zehnder interferometers.

At least one aspect is directed to a parallel optical receiver. The parallel optical receiver includes an optical comb source configured to generate an optical carrier signal including a plurality of optical carriers having a plurality of respective wavelengths. The parallel optical receiver includes a first demultiplexer configured to receive and separate the optical carrier signal into its constituent optical carriers. The parallel optical receiver includes a second demultiplexer configured to receive and separate a combined optical data signal into a plurality of optical component data signals. The parallel optical receiver includes a photonic integrated circuit (PIC) including a plurality of coherent optical receivers configured to extract an analog component data signal from each optical component data signal. The parallel optical receiver includes a plurality of analog-to-digital convertors (ADCs) configured to receive the analog component data signals and convert them into a plurality of respective digital component data signals. The parallel optical receiver includes a processor configured to jointly process the digital component data signals into a single data signal.

In some implementations, the PIC includes the first demultiplexer and the second demultiplexer.

In some implementations, the PIC includes the first demultiplexer and the second demultiplexer the plurality of optical carriers generated by the optical comb source are phase locked with respect to each other.

In some implementations, each coherent optical receiver includes a dual polarization integrated coherent receiver having two 90-degree hybrids and a set of balanced photodiodes.

In some implementations, jointly processing the digital component data signals includes joint polarization demultiplexing, joint clock recovery, joint carrier recovery, joint forward error correction, and joint nonlinear compensation.

At least one aspect is directed to a method of receiving an optical signal. The method includes generating, using an optical comb source, an optical carrier signal including a plurality of optical carriers having a plurality of respective wavelengths. The method includes separating, using a first demultiplexer, the optical carrier signal into its constituent optical carriers. The method includes separating, using a second demultiplexer, a received combined optical data signal into a plurality of optical component data signals. The method includes extracting, using a plurality of coherent optical receivers on a photonic integrated circuit (PIC), an analog component data signal from each optical component data signal. The method includes converting, using a plurality of analog-to-digital convertors (ADCs), the analog component data signals into a plurality of respective digital component data signals. The method includes jointly processing, using a processor, the digital component data signals into a single data signal.

In some implementations, the PIC includes the first demultiplexer and the second demultiplexer.

In some implementations, the PIC includes the first demultiplexer and the second demultiplexer the plurality of optical carriers generated by the optical comb source are phase locked with respect to each other.

In some implementations, each coherent optical receiver includes a dual polarization integrated coherent receiver having two 90-degree hybrids and a set of balanced photodiodes.

In some implementations, jointly processing the digital component data signals includes joint polarization demultiplexing, joint clock recovery, joint carrier recovery, joint forward error correction, and joint nonlinear compensation.

At least one aspect is directed to a parallel optical transponder. The parallel optical transponder includes a processor for joint processing of transmitted and received signals. The parallel optical transponder includes an optical comb source configured to generate a first optical carrier signal including a first plurality of optical carriers at a plurality of respective wavelengths, and a second optical carrier signal including a second plurality of optical carriers at the plurality of respective wavelengths. The parallel optical transmitter includes the processor configured to receive a first data signal and split it into a first plurality of digital component data signals. The parallel optical transmitter includes a plurality of digital-to-analog convertors (DACs) configured to receive the first digital component data signals and convert them into a first plurality of respective analog component data signals. The parallel optical transmitter includes a first photonic integrated circuit (PIC). The first PIC includes a first demultiplexer configured to receive and separate the first optical carrier signal into its constituent first plurality of optical carriers. The first PIC includes a plurality of modulators configured to modulate each first analog component data signal onto a respective first optical carrier to generate a respective first optical component data signal. The first PIC includes a first multiplexer configured to receive and combine the first optical component data signals into a first combined optical data signal. The parallel optical receiver includes a second photonic integrated circuit (PIC). The second PIC includes a second demultiplexer configured to receive and separate the second optical carrier signal into its constituent second plurality of optical carriers. The second PIC includes a third demultiplexer configured to receive and separate a second combined optical data signal into a second plurality of optical component data signals. The second PIC includes a plurality of coherent optical receivers configured to extract a second analog component data signal from each second optical component data signal. The parallel optical receiver includes a plurality of analog-to-digital convertors (ADCs) configured to receive the second analog component data signals and convert them into a second plurality of respective digital component data signals. The parallel optical receiver includes the processor configured to jointly process the second digital component data signals into a second data signal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure generally relates to a system and method of implementing a parallel optical transponder with an optical comb source providing multiple carriers from a single source. While the comb source is more expensive than a conventional continuous-wave source, it allows for use of simpler, smaller, and/or less expensive components in several other places in the transponder.

The main driver for higher capacity and higher bandwidth signals is the desire to reduce the number of optical components such as lasers, modulators, and photodiodes. Reduction of lasers is of particular interest due to their cost and power consumption.

One enabler of increased per-carrier capacity has been an increase in the sample rate of digital signal processor application-specific circuits. For scalability, both the digital gates as well as the analog front ends—namely, the analog-to-digital and digital-to-analog converters—rely on complementary metal oxide semiconductor technology. Continued reduction of power consumption and higher gate count is achieved through decreasing process nodes (e.g., 28 nm, 16, nm, 7 nm).

Analog bandwidth does not scale with decreasing process node scale, however. Thus, it becomes increasingly difficult to increase the sampling rate of the converters to produce broader bandwidth and higher capacity signals. In addition, high speed signals put strict requirements on signal integrity, electrical amplifiers, and optical components. Meeting these requirements can increase cost and power consumption significantly.

This disclosure therefore introduces a parallel optical transponder with an optical comb source providing multiple optical carriers from a single source.

Figure 1:
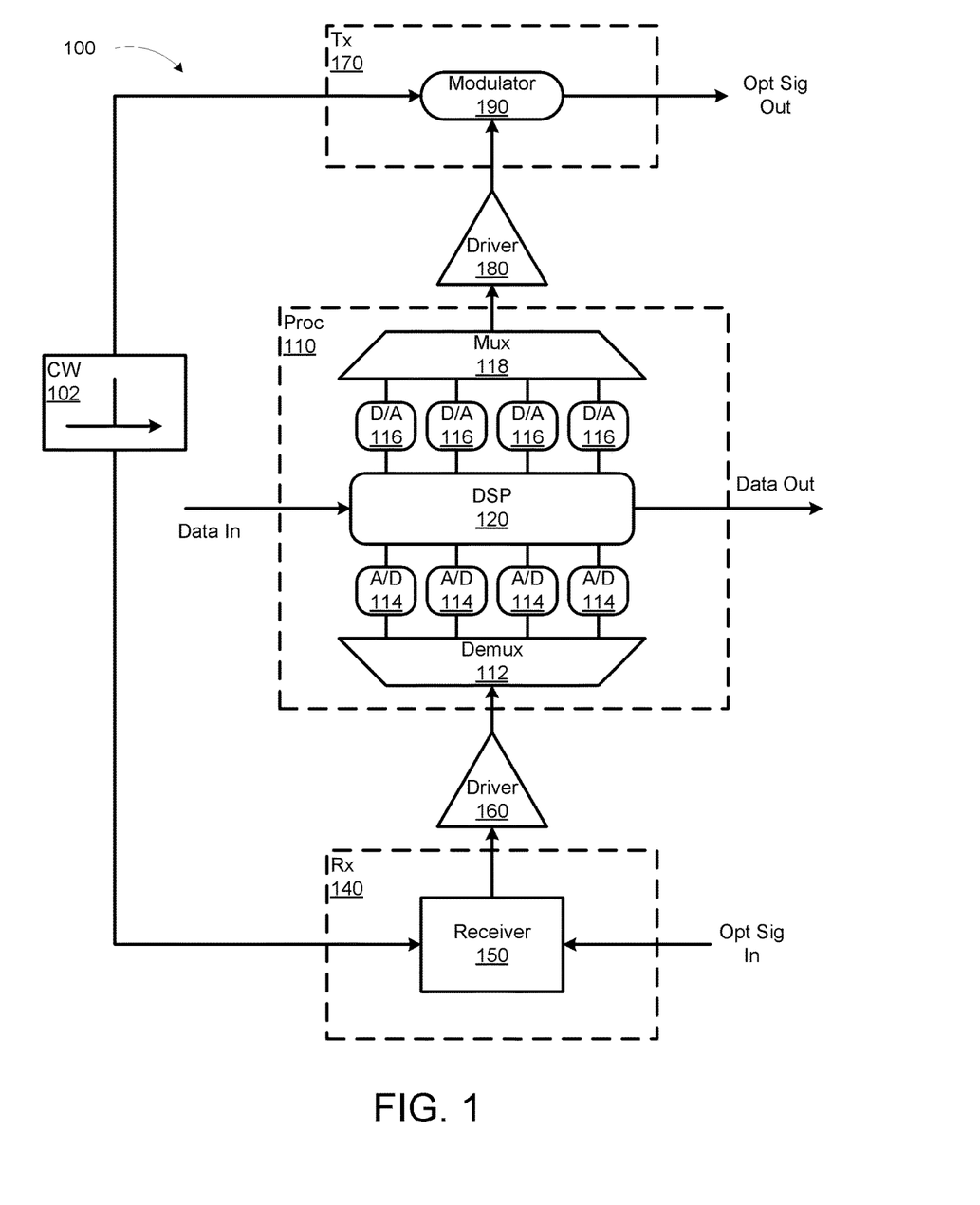
FIG. 1 is a block diagram of an example conventional optical transponder.
Figure 2:
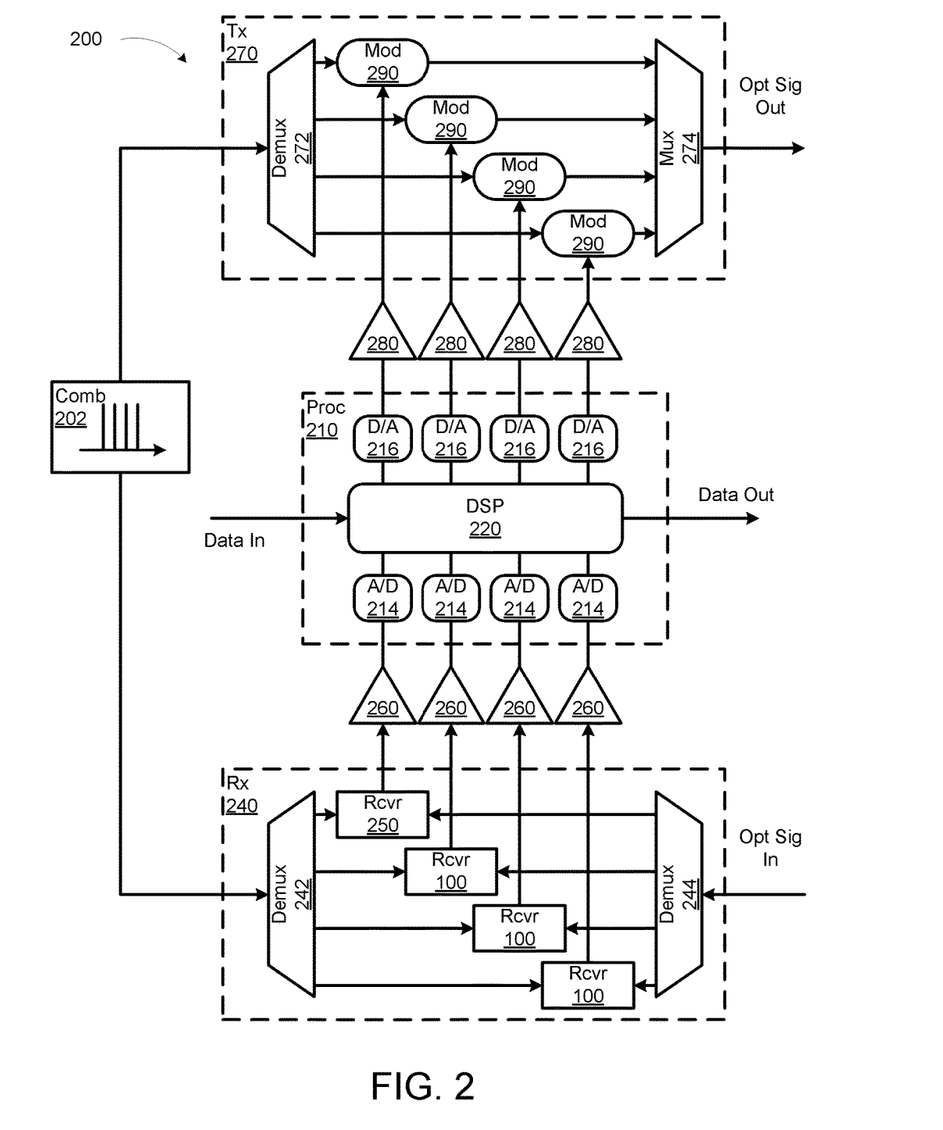
FIG. 2 is a block diagram of a parallel optical transponder with an optical comb source, according to an illustrative implementation.

FIGS. 1 and 2 illustrate some of these differences. Several components of the parallel optical transponder can be replaced with multiple components where the requirements on the replacement components are considerably relaxed. For example, a single high-speed modulator can be replaced by a several lower-speed modulators. The requirements of a single high-speed modulator may have required the use of a high-bandwidth modulator having a traveling wave architecture, while several lumped modulators may perform sufficiently well to replace the single traveling wave architecture. Furthermore, the lumped modulators may have better modulation efficiency, may be significantly smaller than the traveling wave type, and may be easier to integrate in numbers.

The transponder may benefit from the replacement of other single high-performance components with multiple lower-performance components. For example, on the transmitter side, the RF drivers supplying the modulators in the transmitter, and the digital-to-analog converters (DACs) supplying them, can be lower-cost parts operating at lower speeds and with less power. The high-speed DAC multiplexing stage in the DSP ASIC maybe also be omitted, resulting in further cost savings. On the receiver side, lower bandwidth photodetectors and coherent receivers (DP-ICRs) can be made more cheaply than their high-speed counterparts. The transimpedance amplifiers boosting the photodetector signals can be lower-cost parts operating with less power.

There are additional benefits to performing processing of the received signals. Because a comb source is used as both the local oscillator and the transmit carrier, individual optical carriers of the comb may be phase locked with respect to each other. This enables a DSP to perform joint carrier recovery among multiple, and in some cases all, carriers hence the same or substantially similar linewidth tolerance can be achieved as in the single carrier conventional case.

FIG. 1 is a block diagram of an example conventional optical transponder 100. The optical transponder 100 includes a processor 110 receiving data from a receiver module 140 and providing data to a transmitter module 170. A continuous-wave light source 102 provides a carrier to the transmitter module 170. The same source 102 or a second source can provide the same or a similar carrier to the receiver module 140. For simplicity, FIG. 1 has used a single block to represent multiple similar components. For example, the drivers 180 and 160 each represent four individual amplifiers respectively amplifying four distinct analog signals. Also, the modulator 190 would include four inputs, and the receiver 150 would include four outputs. These four signals can represent two polarizations times two quadratures.

The continuous-wave (CW) light source 102 can be an optical laser. An ideal CW laser would emit a single wavelength only and thus provide a single optical carrier for the transmitter module 170. In some cases, the CW light source 102 can be split and reused to serve as a local oscillator for the receiver module 140.

The receiver module 140 uses the carrier provided by the source 102 to down convert an incoming optical signal to an electrical signal. The receiver module 140 includes a receiver 150. The receiver 150 can be a dual polarization integrated coherent receiver (DP-ICR). The DP-ICR can include two 90-degree hybrids and a photodetector. The photodetector can be a set of high-speed balanced photodiodes.

The receiver module 140 provides its output electrical signal to the processor 110 via a driver 160. The driver 160 amplifies the signal from the photodetector. In some cases, the driver 160 can be a transimpedance amplifier that converts the current signal from the photodetector to a voltage signal for digitization at the analog-to-digital converters 114 of the processor 110.

The processor 110 receives the down converted electrical signal from the receiver module 140 via the driver 160. The processor 110 includes a demultiplexer 112, a plurality of analog-to-digital converters (ADCs) 114 and a digital signal processor (DSP) 120. The demultiplexer 112 splits the down converted electrical signal (as amplified by the driver 160) into multiple analog electrical signals for sampling by the ADCs 114. The ADCs 114 digitize the multiple analog electrical signals and provide the parallelized sampled signal to the DSP 120 for processing. The DSP 120 completes demodulation to recover the payload data.

The DSP 120 also processes a data signal for optical transmission from the transponder 100. The DSP 120 processes the data signal into parallelized digital electrical signals. The processor 110 includes digital-to-analog converters (DACs) 116 and a multiplexer 118. The DACs 116 convert the digital signals output by the DSP 120 into analog electrical signals. The multiplexer 118 combines the analog electrical signals and provides them to the transmitter module 170 via the driver 180. The driver 180 amplifies the combined analog electrical signal to a level adequate to drive the modulator of the transmitter module 170.

The transmitter module 170 uses the carrier provided by the source 102 to up convert an outgoing combined analog electrical signal from the processor 110 into an outgoing optical signal. The transmitter module 170 includes a modulator 190. The modulator 190 can be a dual polarization inphase quadrature Mach Zehnder Modulator (DP-MZM). The modulator 190 encodes the combined analog electrical signal onto the carrier provided by the source 102 and outputs the optical signal.

The digital processing of the DSP 120 is performed in a parallelized fashion to constrain the chip's internal frequencies. Within the processor 110, many parallel DACs 116 can run at a reduced rate and be multiplexed by the multiplexer 118 within the processor 110 to form a high-speed drive signal. While it may be possible to add more DACs 116 within the processor 110, the maximum achievable signal bandwidth after the multiplexer 118 may be limited by the multiplexer 118 itself, the driver 180, or the modulator 190. Even within the bandwidth limits of the components, handling the high signal bandwidth can require expensive components. For example, the transmitter module 170 may require a so-called traveling wave MZM for the modulator 190. Traveling wave MZMs are very large relative to lumped MSMs, and therefore require more area on a semiconductor wafer and are thus significantly more expensive. Handling the high signal bandwidth may also require a larger, more expensive amplifier with high power consumption for the driver 180. In addition, radio frequency (RF) traces on the printed circuit boards and photonic integrated circuits of the transponder 100 may require careful routing and more space, further constraining and increasing the cost of the transponder 100.

FIG. 2 therefore presents a parallel transponder system where an optical comb source and joint processing of signals in the DSP allows for use of lower-bandwidth, lower-cost components in the rest of the transponder, thereby lowering the overall cost of the system while maintaining the same performance characteristics.

FIG. 2 is a block diagram of a parallel optical transponder 200 with an optical comb source, according to an illustrative implementation. The parallel optical transponder 200 includes a processor 210 receiving data from a parallel receiver module 240 and providing data to a parallel transmitter module 270. An optical comb source 202 provides an optical carrier signal including a plurality of optical carriers to the parallel transmitter module 270 and the parallel receiver module 140. As in FIG. 1, FIG. 2 uses a single block to represent multiple similar components. For example, the drivers 280 and 260 each represent four individual amplifiers respectively amplifying four distinct analog signals. Also, the modulators 290 each include four inputs, and the receivers 150 each include four outputs. These four signals can represent two polarizations times two quadratures.

The optical comb source 202 provides an optical carrier signal including a plurality of optical carriers having a plurality of respective wavelengths. The optical comb source 202 generates an output having several carriers that are provided together to the parallel the transmitter module 270 and receiver module 240 where they are demultiplexed and used for up converting and down converting signals to and from the optical domain, respectively. Although the multi-carrier optical comb source 202 is more complex and expensive relative to a continuous-wave source, use of the multi-carrier source can allow for relaxed bandwidth requirements on the analog electrical signal path. The overall parallel optical transponder 200 system is therefore optimized for lower cost.

The processor 210 includes a digital signal processor 220. The DSP 220 receives a data signal for transmission and splits it into a plurality of component data signals. The processor 210 also includes digital-to-analog converters (DACs) 216 for converting the digital component data signals into analog component data signals. In the parallel optical transponder 200, each DAC 116 block represents four digital-to-analog converters respectively converting four digital component data signals provided by the DSP 220. Because the data signal has been split into more digital component data signals, the bandwidth of each is lower, which in turns lowers the bandwidth requirements of the components in the analog electrical signal path. For example, the DACs 216 can have a lower bandwidth, and thus be made smaller, cheaper, and with lower power consumption. In addition, because the digital component data signals are split among multiple modulators 290 instead of a single modulator as in the example of transponder 100 previously described, the parallel optical transponder 200 does not need a high-speed multiplexing stage such as the multiplexer 118 of the transponder 100. Dispensing with the high-speed multiplexing stage leads to additional power and cost savings.

The processor 210 provides the analog component data signals to the parallel transmitter module 270 via a plurality of drivers 280. Due to the lower speed and voltage requirements of the modulators 290, as described below, the drivers 280 may be of lower speed and lower power consumption, making them less costly than the driver 180 of the transponder 100. In some implementations, the DACs 216 may be able to produce analog component data signals of sufficient voltage and/or power to drive the modulators 290 without the need for the drivers 280, further reducing the cost and complexity of the parallel optical transponder 200.

The parallel transmitter module 270 uses the optical carrier signal provided by the optical comb source 202 to up convert the analog component data signals from the processor 210 into an outgoing combined optical data signal. The parallel transmitter module 270 can be fabricated as a photonic integrated circuit (PIC). The parallel transmitter module 270 includes a demultiplexer 272 configured to receive and separate the optical carrier signal generated by the optical comb source 202 into its constituent optical carriers, a plurality of modulators 290 configured to receive the analog component data signals and modulate each onto a respective optical carrier to generate a respective optical component data signal, and a multiplexer 274 configured to receive and combine the optical component data signals into a combined optical data signal.

As with the components in the analog electrical signal path, parallel optical transponder 200 can use multiple modulators 290 with relaxed performance requirements over a single modulator 190 as in the transponder 100. In some implementations, the modulators 290 can be dual polarization Mach-Zehnder Modulators (DP-MZMs). Because the DP-MZMs can operate at significantly lower speed, they can be fabricated as lumped modulators instead of the larger and more expensive traveling wave modulators. Lumped modulators can be significantly smaller than traveling wave modulators, and are thus easier to integrate in numbers. In addition, lumped modulators can exhibit better modulation efficiency than traveling wave modulators.

Further cost improvements can be found due to the relaxed speed requirements. For example, relatively lower speed lumped modulators can have significantly higher voltage-to-phase efficiency (often defined as Vpi, the voltage needed to induce a phase shift of pi). In some implementations, the modulators 290 can be optimized for modulation efficiency instead of bandwidth. Increased modulation efficiency can be achieved with longer electrode design, with a corresponding decrease in bandwidth. In some implementations, the modulators 290 can operate at a bandwidth below 20 GHz. In some implementations, the modulators 290 can operate at a bandwidth of between 5 and 10 GHz. In some implementations, the modulators 290 can operate at approximately 8 GHz. The improved Vpi of the modulators 290 operating at these speeds can render the drivers 280 unnecessary if the DACs 116 can produce voltage levels adequate for modulation, resulting in a further reduction in cost and complexity of the parallel optical transponder 200.

The parallel optical transponder 200 also includes the parallel receiver module 240. The parallel receiver module 240 uses the optical carrier signal provided by the optical comb source 202 to down convert an incoming combined optical data signal to a plurality of electrical signals. The parallel receiver module 240 can be fabricated on a photonic integrated circuit (PIC). The parallel receiver module 240 includes a first demultiplexer 242 configured to receive and separate the optical carrier signal from the optical comb source 202 into its constituent optical carriers, and a second demultiplexer 244 configured to receive and separate a combined optical data signal into a plurality of optical component data signals. The parallel receiver module 240 includes a plurality of coherent optical receivers 250 configured to extract an analog component data signal from each optical component data signal.

Similar improvements in cost and complexity can be made on the receiver side. As in the parallel transmitter module 270, the parallel receiver module 240 can demultiplex the multi-carrier signal from the optical comb source 202 into its constituent optical carriers on the parallel receiver module 240. The coherent optical receivers 250 can include multiple dual polarization integrated coherent receivers (DP-ICRs) in parallel. The individual DP-ICRs of the parallel optical transponder 200 can be lower speed than the DP-ICRs of the transponder 100, and thus lower cost.

Each receiver 250 can include a photodetector. Each photodetector can include a set of high-speed balanced photodiodes. Again, due to the lower speed of each receiver 250, the photodetectors used can exhibit increased responsiveness to the optical signal they receive, and in some cases can be replaced with lower speed, lower cost devices. In some implementations, the photodetectors can operate at a bandwidth below 20 GHz. In some implementations, the photodetectors can operate at a bandwidth of between 5 and 10 GHz. In some implementations, the photodetectors can operate at approximately 8 GHz. The increased sensitivity of the photodetectors at this speed allows the use of lower gain drivers 260. In addition, the reduced bandwidth allows the use of lower speed drivers 260. Thus, the drivers 260 consume less power and are less costly than the relatively higher speed (bandwidth greater than approximately 32 GHz) used in the transponder 100. In addition, the lower bandwidth of the analog component data signals from the receivers 250 relaxes the signal integrity requirements of signal routing between the output of the drivers 260 and the ADCs 214. Finally, the ADCs 214 themselves can have lower bandwidths, resulting in further cost savings.

The processor 210 receives the analog component data signals from the parallel receiver module 240 via the plurality of drivers 260. The processor 210 includes a plurality of analog-to-digital converters (ADCs) 214 and the DSP 220. The ADCs 214 convert the analog component data signals into digital component data signals for processing by the DSP 220. Due to using an optical comb source 202 as the local oscillator and transmit carrier, individual optical carriers of the comb may be phase locked with respect to each other. This can enable the DSP 220 to perform joint carrier recovery on the digital component data signals. The DSP 220 can perform joint carrier recovery among multiple, or in some cases, all of the carriers—thus allowing the same linewidth tolerance as in the single carrier case of the transponder 100. The DSP 220 can also perform joint processing at other steps of the demodulation process. For example, the DSP 220 can digitally filter components of neighboring carriers from each digital component data signal. The DSP 220 can also perform joint processing for the purpose of clock recovery. Further DSP 220 savings can be obtained through simplified chromatic dispersion compensation, which can be performed as a frequency and time domain hybrid (parabolic phase in the frequency domain and simple barrel shift in the time domain), thus saving a significant number of gates in the DSP 220. This can be an important feature when receiving signals over new, high-dispersive fiber types, and with chromatic dispersion scaling with the square of the signal bandwidth. Operation of the DSP 220, including the individual function blocks therein, are described further below with reference to FIG. 3.

Figure 3:
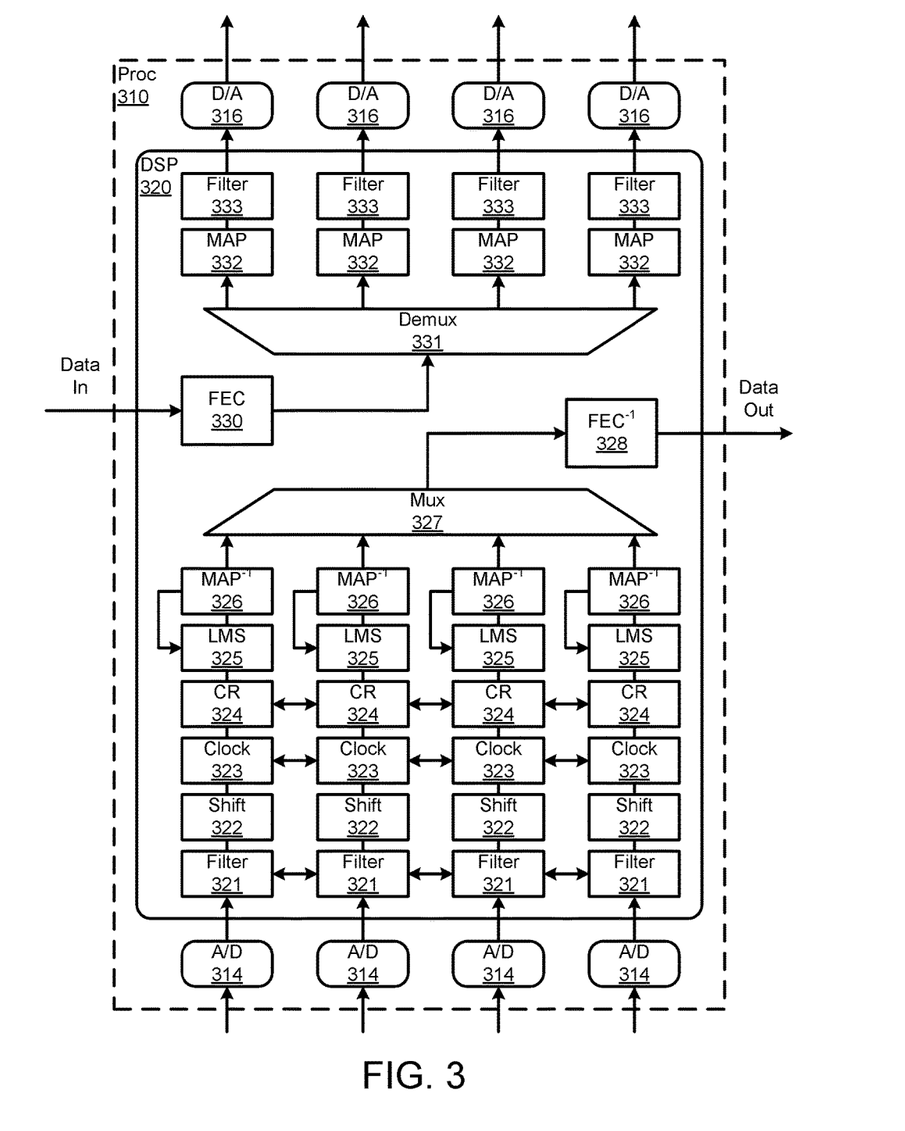
FIG. 3 is a block diagram of a processor including a digital signal processor for use in a parallel optical transponder, according to an illustrative implementation.

FIG. 3 is a block diagram of a processor 310 including a digital signal processor (DSP) 320 for use in a parallel optical transponder, according to an illustrative implementation. For example, the processor 310 could serve as the processor 210 in the parallel optical transponder 200 previously described. The processor 310 can include a receive side and a transmit side. The receive side receives analog component data signals from a receiver module such as the parallel receiver module 240 of the parallel optical transponder 200, demodulates them, and outputs a single data signal. The transmitter side receives a data signal, splits it into a plurality of digital component data signals, converts the digital component data signals into analog component data signals, and provides them to a transmitter module such as the parallel transmitter module 270. In some implementations, both the receiver side and the transmitter side share the DSP 320.

On the transmitter side, the processor 310 includes a forward error correction (FEC) encoder 330, a demultiplexer 331, a plurality of mapping blocks 332, a plurality of filters 333, and a plurality of digital-to-analog converters (DACs) 316.

The forward error correction (FEC) encoder 330 receives the data signal containing the payload data for transmission. The FEC encoder 330 performs forward error correction encoding. The FEC encoding can introduce a certain amount of redundancy into the transmission that allows the receiver to detect and correct some errors in the transmission without retransmission. The FEC encoded data signal is then provided to the demultiplexer 331.

The demultiplexer 331 splits/demultiplexes the data signal into a number N parallel data streams. In the DSP 320 of FIG. 3, the data signal is split into N=4 parallel data streams. The demultiplexer 331 then provides the N data streams to respective modulation alphabet (MAP) blocks 332.

Each MAP block 331 maps a data stream to a modulation alphabet. The modulation alphabet represents each discrete value the modulated signal can take. The MAP blocks 331 then provide each mapped data stream to a filter 333.

Each filter 333 block can include a digital finite impulse response (FIR) filter. The FIR filters can be implemented in the time domain or the frequency domain. The filters 333 can then output a plurality of digital component data signals and provide them to the DACs 316 for conversion.

The DACs 316 convert the digital component data signals to the analog domain. Each DAC 316 block includes four converters per optical subchannel (data stream) for coherent transmission. The four analog component data signals represent the inphase and quadrature signals for X and Y polarizations. The DAC 316 outputs drive the optical modulators, such as the modulators 290. In some implementations, the analog component data signals can receive additional amplification from drivers such as the drivers 280. The analog component data signals can then be modulated onto respective optical carriers by modulators such as the modulators 290.

On the receiver side, the processor 310 includes a plurality of analog-to-digital converters (ADCs) 314, a plurality of filters 321, a plurality of shift registers 322, a plurality of clock recovery blocks 323, a plurality of carrier recovery blocks 324, a plurality of least mean squares (LMS) adaptive equalizers 325, a plurality of constellation demapping blocks (MAP$^{-1}$) 326, a multiplexer 327, and a forward error correction decoder (FEC$^{-1}$) 328.

The plurality of analog-to-digital converters (ADCs) 314 receive analog component data signals from receivers such as the receivers 250. Each ADC 314 block represents four analog-to-digital converters for converting each of the four signals produced by a receiver 250 (quadrature and inphase for each of the X and Y polarizations). The ADC 314s convert the analog component data signals to digital component data signals and provide them to the filters 321.

The filters 321 receive the digital component data signals from the ADCs 314 and apply a finite impulse response (FIR) filter to the signals to compensate for accumulated chromatic dispersion (CD) and polarization mode dispersion (PMD). The filters 321 can benefit from joint processing of the subchannels of the digital component data signals within the DSP 320. For example, if optical subchannels are transmitted on adjacent optical carriers, both CD and PMD estimation can be shared among subchannels, thereby improving the filter in terms of robustness and convergence time. In some implementations, CD compensation need only be performed on a subchannel bandwidth, which shortens the required filter length, where the filter length scales with the square of the bandwidth. The filters 321 provide the filtered signals to the shift registers 322.

The shift registers 322 can remove accumulated delays in multiples of symbols introduced by the filters 321. The shift registers 322 can provide the signals to the clock recovery blocks 323.

The clock recovery blocks 323 receive the signal from the shift registers 322 and perform recovery of the clock signal. Clock recovery can also benefit from joint processing of the subchannels within the DSP 320. In particular, because all subchannels originate from the same DSP chip, they all share a common clock and can be processed jointly. Following clock recovery, the signals can be provided to the carrier recovery blocks 324.

The carrier recovery blocks 324 also benefits from joint processing if the multi-wavelength source provided phase locked carriers, such as are provided by the optical comb source 202. Jointly processing signals for carrier recovery can improve the DSP's 320 tolerance to effects such as laser phase noise. Following carrier recovery, the signals can be provided to the least mean squares (LMS) adaptive equalizers 325.

The LMS adaptive equalizers 325 can act on each subchannel individually. The LMS adaptive equalizers 325 can use a feedback signal from the constellation demapping blocks 326 to adapt to time-varying effects on the signals caused by the communication channel. Following adaptive equalization, The constellation demapping blocks (MAP$^{-1}$) 326 can demap each subchannel to produce a demapped binary data signal. The binary data signal can be provided to the multiplexer 327 for multiplexing into a single data signal, which is then provided to the forward error correction decoder (FEC$^{-1}$) 328 for FEC decoding to provide the receive payload data. The payload data is then output from the DSP 320 and the processor 310 as a single data signal.

In some implementations, using phase locked carriers from the optical comb source can facilitate additional joint processing on the DSP 320. For example, the DSP 320 can facilitate joint non-linearity compensation at the transmitter and/or the receiver side. The joint non-linearity compensation can improve the efficiency of the operation of the DSP 320.

Figure 4:
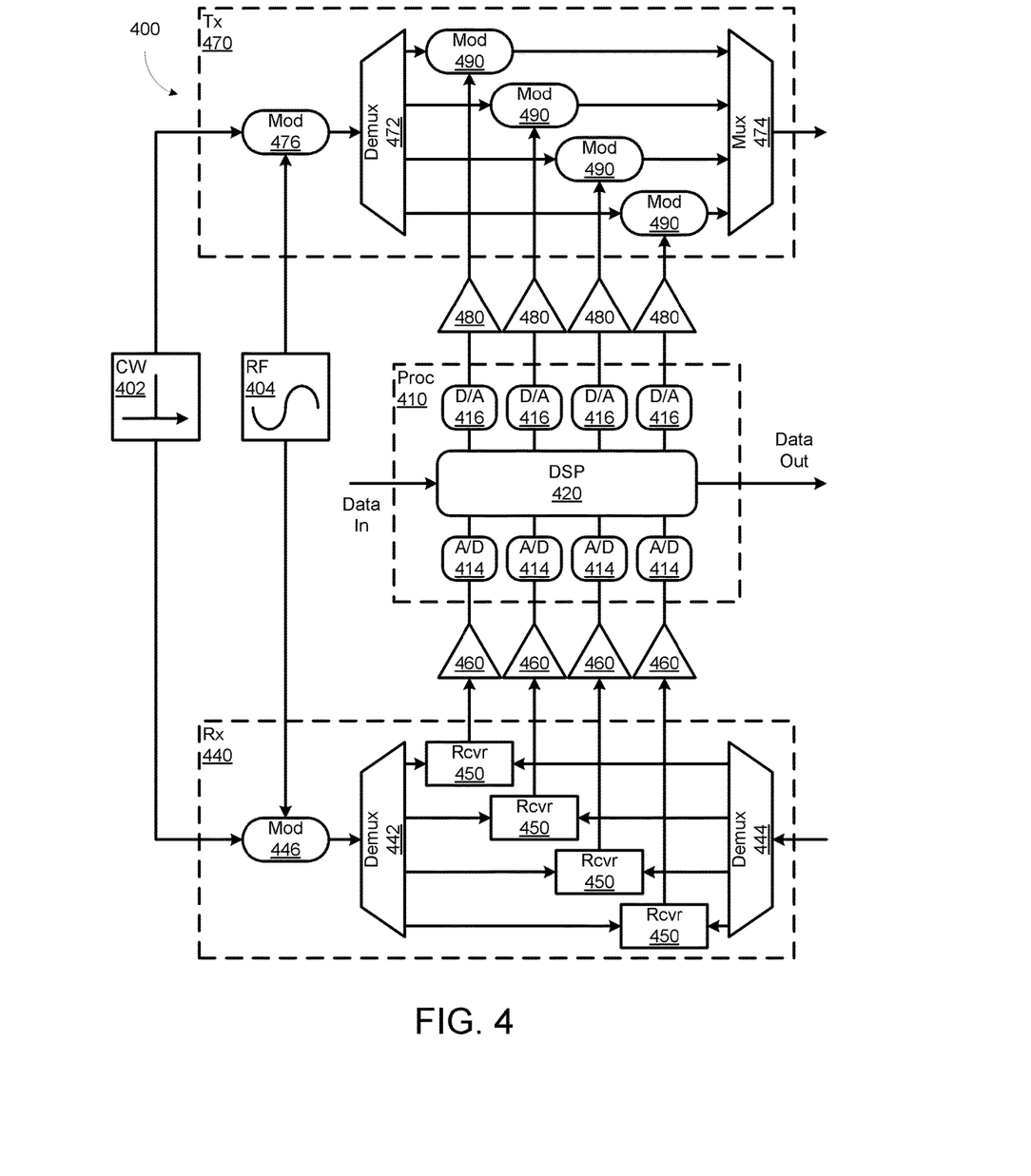
FIG. 4 is a block diagram of a parallel optical transponder with an on-chip optical comb source, according to an illustrative implementation.

FIG. 4 is a block diagram of a parallel optical transponder 400 with an on-chip optical comb source, according to an illustrative implementation. The parallel optical transponder 400 is similar to the parallel optical transponder 200 previously described, except that optical comb generation takes place on-chip. That is, each of the parallel receiver module 440 and the transmitter module 470 can receive a continuous-wave optical signal from a continuous-wave light source 402 and a radio frequency (RF) electrical signal from an RF generator 404. Each of the parallel receiver module 440 and the transmitter module 470 includes a modulator 446 and 476, respectively, for generating an optical comb signal from the continuous-wave optical signal and the RF electrical signal. The resulting optical carrier signal can be separated into its plurality of optical carriers by demultiplexers 242 and 272, respectively, as in the parallel optical transponder 200.

Generating optical combs using an optical modulator such as a Mach-Zehnder Modulator (MZM) along with a radio frequency (RF) electrical signal, usually sinusoidal, can yield approximately ten to twenty optical carriers. In some implementations, additional optical amplification may be helpful depending on the power levels needed by the modulators 490. Such optical amplification could be performed by semiconductor optical amplifiers on the transmitter module 470 and/or the receiver module 440. With the comb generating structure of the modules 470 and/or 440, a continuous-wave laser, such as the continuous-wave (CW) light source 102, may be sufficient to drive the modules 470 and/or 440. The modulators 476 and 446 used for this purpose, by virtue of modulating only the single frequency generated by the RF source 404, can be much simpler than the comparatively broadband modulators 490. The remainder of the parallel optical transponder 400 may be similar or equivalent to the corresponding portion of the parallel optical transponder 200.

Figure 5:
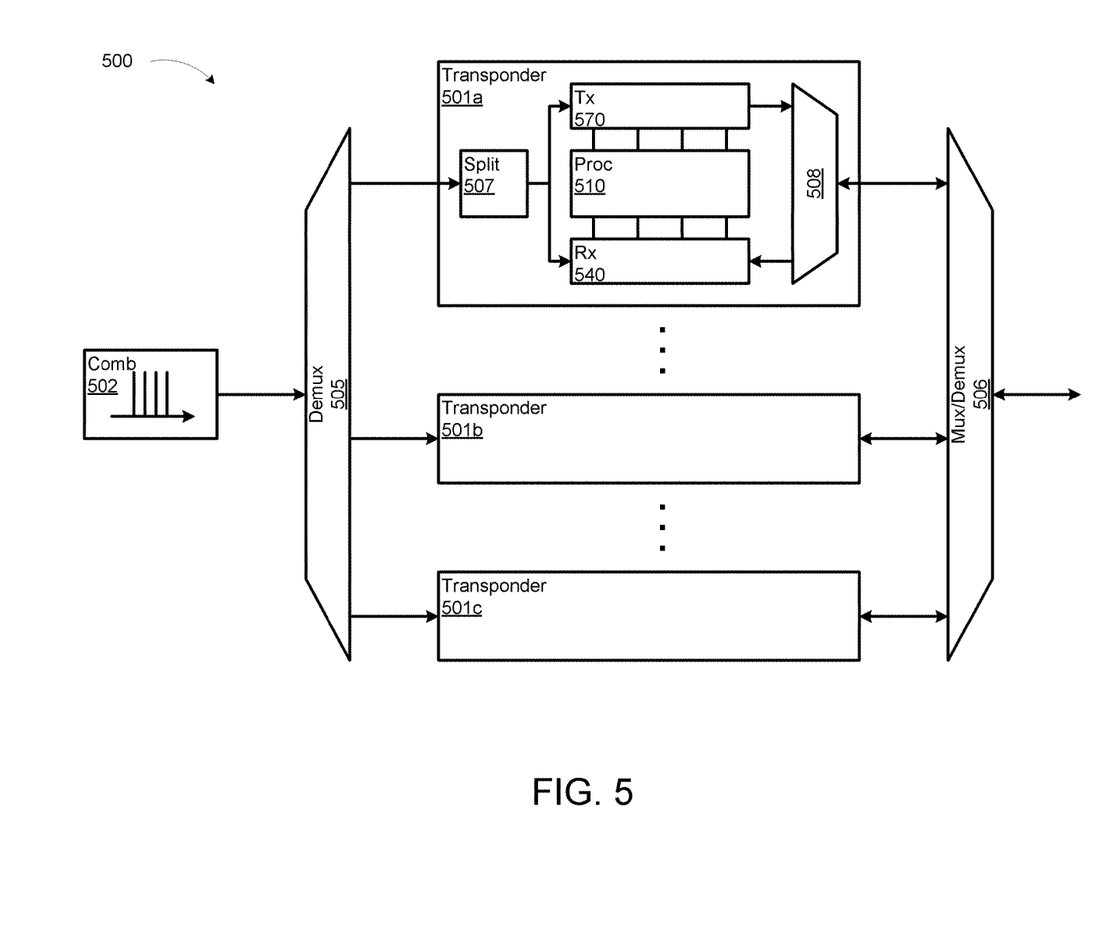
FIG. 5 is a block diagram of parallel optical transponders with a shared optical comb source forming a full-spectrum optical transponder, according to an illustrative implementation.

FIG. 5 is a block diagram of parallel optical transponders with a shared optical comb source 502 forming a full-spectrum optical transponder 500, according to an illustrative implementation. The full-spectrum optical transponder 500 includes the shared optical comb source 502, a demultiplexer 505 providing one or more optical carriers to each of a plurality of parallel optical transponders 501a, 501b, or 501c (collectively "parallel optical transponders 501"). The full-spectrum optical transponder 500 also includes a multiplexer/demultiplexer (mux/demux) 506 for combining signals transmit from each transponder 501, and split received signals among the transponders 501.

The optical comb source 502 may be a single broadband comb source that can span part or all of the whole communication window of, for example, approximately 10 THz for C and L band transmission. In some implementations, a single optical source can be demultiplexed by the demultiplexer 505 to provide a continuous-wave or a set of optical carriers to the parallel optical transponders 501. For example, if the parallel optical transponder 501a has a configuration similar to the parallel optical transponder 200, the demultiplexer 505 can provide the parallel optical transponder 501a with an optical comb having a plurality of optical carriers. The parallel optical transponder 501a can include a splitter 507 to provide the optical carriers to both the transmitter module 570 and the receiver module 540. An additional multiplexer/demultiplexer 508 and route optical signals to and from the transmitter module 570 and the receiver module 540.

If the parallel optical transponder 501b has a configuration similar to the parallel optical transponder 400, the demultiplexer 505 can provide the parallel optical transponder 501b with a continuous-wave optical carrier for modulation into a set of optical carriers in the transmitter and receiver modules of the parallel optical transponder 501b.

In some implementations, the parallel optical transponders 501 can each be of a single type. In some implementations, the parallel optical transponders 501 can include two or more different types of parallel optical transponders.

Sharing a single light source across multiple transponders 501 can further reduce the cost of the full-spectrum optical transponder 500, particularly in high-capacity deployments.

Figure 6:
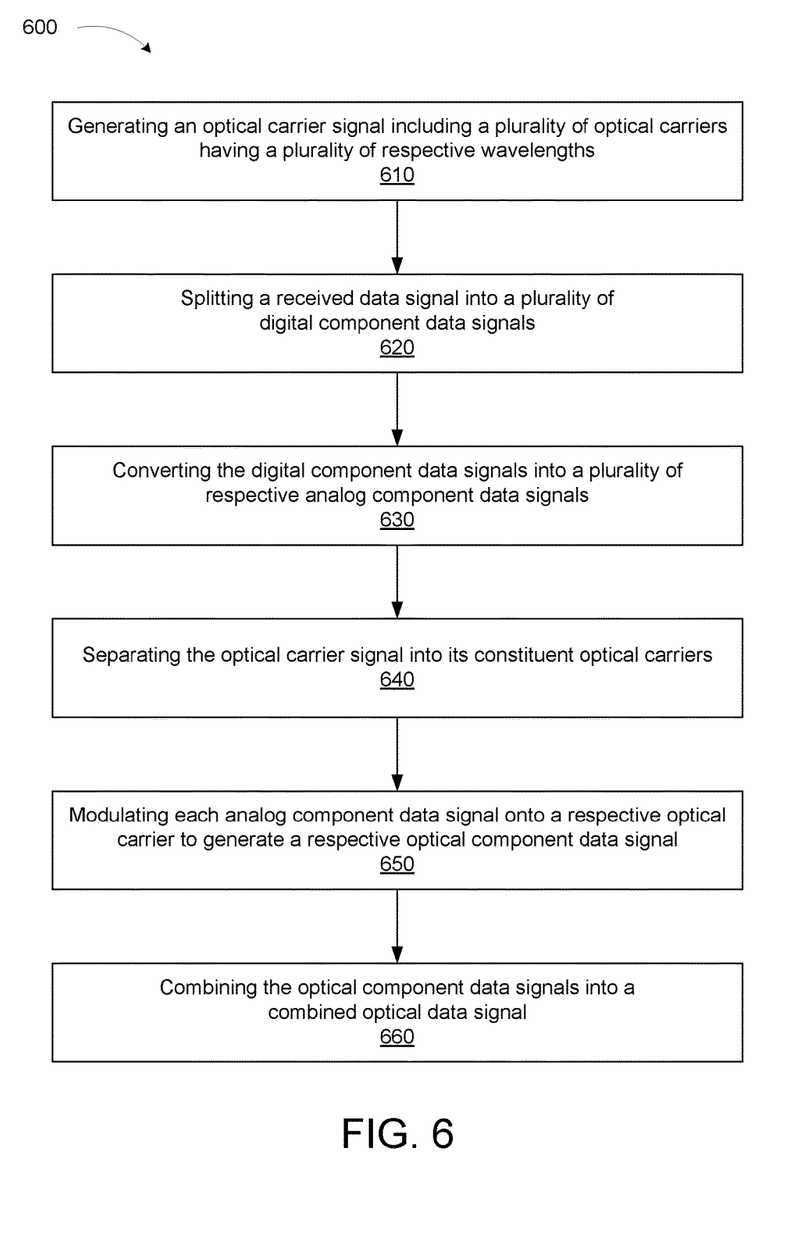
FIG. 6 shows a flowchart of an example method of transmitting an optical signal using a parallel optical transponder with an optical comb source, according to an illustrative implementation.

FIG. 6 shows a flowchart of an example method 600 of transmitting an optical signal using a parallel optical transponder with an optical comb source, according to an illustrative implementation. The parallel optical transponder can be, for example, one of the parallel optical transponders 200, 400, or 500 previously described. The method 600 includes generating an optical carrier signal including a plurality of optical carriers having a plurality of respective wavelengths (stage 610). The method 600 includes splitting a received data signal into a plurality of digital component data signals (stage 620). The method 600 includes converting the digital component data signals into a plurality of respective analog component data signals (stage 630). The method 600 includes separating the optical carrier signal into its constituent optical carriers (stage 640). The method 600 includes modulating each analog component data signal onto a respective optical carrier to generate a respective optical component data signal (stage 650). The method 600 includes combining the optical component data signals into a combined optical data signal (stage 660).

The method 600 includes generating an optical carrier signal including a plurality of optical carriers having a plurality of respective wavelengths (stage 610). In some implementations, the optical carrier signal can be generated by an optical comb source, such as the optical comb source 202. In some implementations, the optical carrier signal can be generated by an modulating a continuous-wave optical signal with a radio-frequency (RF) electrical signal. In some implementations, modulation of the continuous-wave optical signal can be performed using a modulator on a photonic integrated circuit that also includes modulators for modulating each analog component data signal. In some implementations, the plurality of optical carriers generated by the optical comb source are phase locked with respect to each other The method 600 includes splitting a received data signal into a plurality of digital component data signals (stage 620). The received data signal can be split into a plurality of digital component data signals using a processor, such as the processor 210 or 410. The processor can perform forward error correction encoding, demultiplexing into subchannels, mapping the subchannels to the modulation alphabet, and filtering before providing digital component data signals to digital-to-analog converters such as the DACs 216, 316, or 426.

The method 600 includes converting the digital component data signals into a plurality of respective analog component data signals (stage 630). The conversion can be performed by digital-to-analog converters such as the DACs 216, 316, or 416. The DACs can be associated with, or a component of, the processor 210, 310, or 410, or the DSP 220, 320, or 420. In some implementations, the analog component data signals can be amplified using drivers such as the drivers 280 or 480. In some implementations, however, the DACs can provide the analog component data signals directly to the modulating the analog component data signals.

The method 600 includes separating the optical carrier signal into its constituent optical carriers (stage 640). The optical carrier signal can be separated into the optical carriers using an optical demultiplexer, such as the demultiplexer 272 or the demultiplexer 472. In some implementations, the optical demultiplexer can be on a photonic integrated circuit that also includes modulators for modulating each analog component data signal. The demultiplexer can provide the individual optical carriers to respective modulators for modulating the analog component data signals.

The method 600 includes modulating each analog component data signal onto a respective optical carrier to generate a respective optical component data signal (stage 650). Each analog component data signals can be modulated onto a respective optical carrier using a modulator such as the modulator 290 or 490 to generate a respective optical component data signal. In some implementations, the modulators a lumped Mach-Zehnder interferometers. The optical component data signal is provided to the multiplexer for combining with the other optical component data signals.

The method 600 includes combining the optical component data signals into a combined optical data signal (stage 660). The optical component data signals can be combined using an optical multiplexer such as the multiplexer 274 or 474. In some implementations, the optical multiplexer can be on a photonic integrated circuit that also includes modulators for modulating each analog component data signal.

Figure 7:
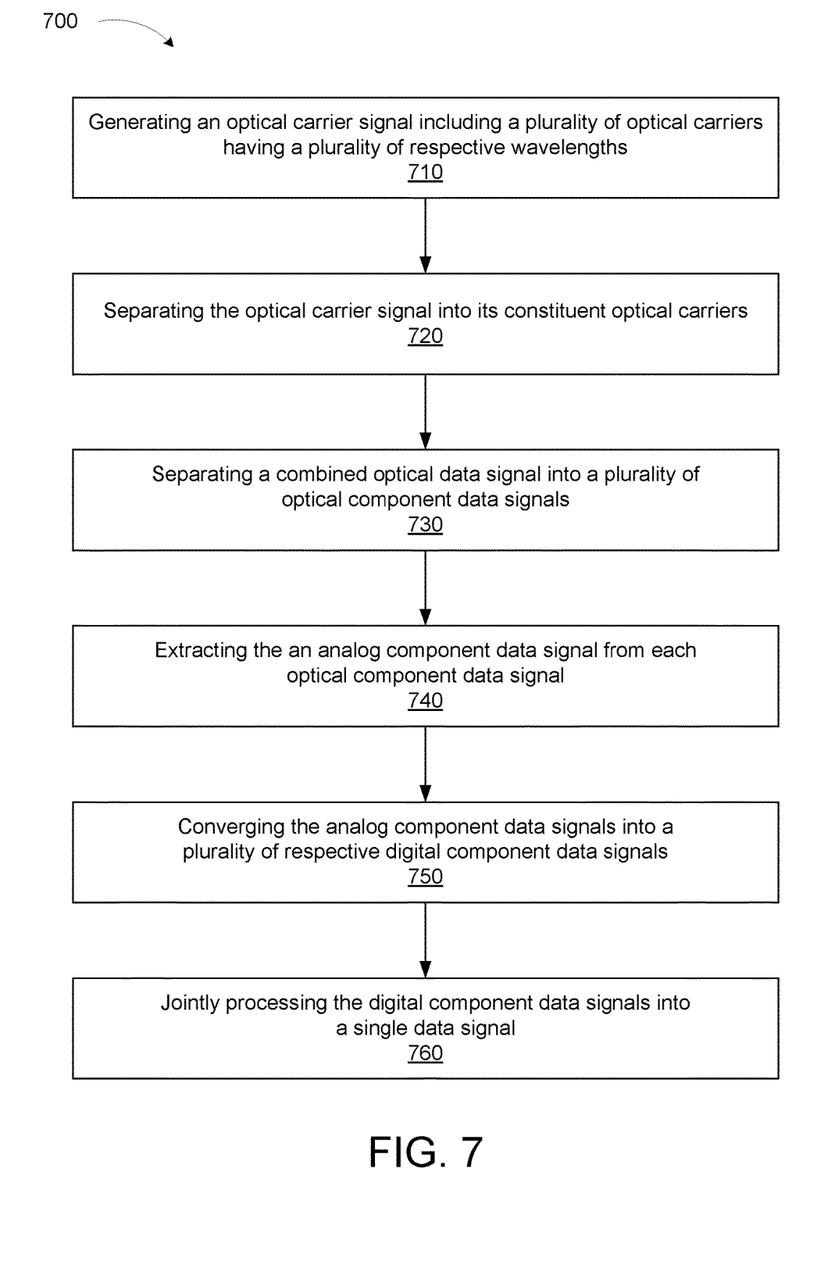
FIG. 7 shows a flowchart of an example method of receiving an optical signal using a parallel optical transponder with an optical comb source, according to an illustrative implementation.

FIG. 7 shows a flowchart of an example method 700 of receiving an optical signal using a parallel optical transponder with an optical comb source, according to an illustrative implementation. The parallel optical transponder can be, for example, one of the parallel optical transponders 200, 400, or 500 previously described. The method 700 includes generating an optical carrier signal including a plurality of optical carriers having a plurality of respective wavelengths (stage 710). The method 700 includes separating the optical carrier signal into its constituent optical carriers (stage 720). The method 700 includes separating a combined optical data signal into a plurality of optical component data signals (stage 730). The method 700 includes extracting the an analog component data signal from each optical component data signal (stage 740). The method 700 includes converting the analog component data signals into a plurality of respective digital component data signals (stage 750). The method 700 includes jointly processing the digital component data signals into a single data signal (stage 760).

The method 700 includes generating an optical carrier signal including a plurality of optical carriers having a plurality of respective wavelengths (stage 710). In some implementations, the optical carrier signal can be generated by an optical comb source, such as the optical comb source 202. In some implementations, the optical carrier signal can be generated by an modulating a continuous-wave optical signal with a radio-frequency (RF) electrical signal. In some implementations, modulation of the continuous-wave optical signal can be performed using a modulator on a photonic integrated circuit that also includes modulators for modulating each analog component data signal. In some implementations, the plurality of optical carriers generated by the optical comb source are phase locked with respect to each other The method 700 includes separating the optical carrier signal into its constituent optical carriers (stage 720). The optical carrier signal can be separated into the optical carriers using an optical demultiplexer, such as the demultiplexer 272 or the demultiplexer 472. In some implementations, the optical demultiplexer can be on a photonic integrated circuit that also includes modulators for modulating each analog component data signal. The demultiplexer can provide the individual optical carriers to respective modulators for modulating the analog component data signals.

The method 700 includes separating a received combined optical data signal into a plurality of optical component data signals (stage 730). A second optical demultiplexer such as the demultiplexer 244 or 444 can receive a combined optical data signal and separate it into its constituent optical component data signals. The second demultiplexer can provide the optical component data signals to optical receivers such as the receivers 450.

The method 700 includes extracting the an analog component data signal from each optical component data signal (stage 740). The extraction of the analog component data signals can be performed using a plurality of coherent optical receivers, such as receivers 250 or 450, on a photonic integrated circuit. The coherent optical receivers can use the optical carriers separated by the first demultiplexer to extract the analog component data signals from their respective optical carriers.

The method 700 includes converting the analog component data signals into a plurality of respective digital component data signals (stage 750). The conversion can be performed by analog-to-digital converters such as the ADCs 214, 314, or 414. The ADCs can be associated with, or a component of, the processor 210, 310, or 410, or the DSP 220, 320, or 420. In some implementations, the analog component data signals can be amplified using drivers such as the drivers 260 or 460 prior to conversion.

The method 700 includes jointly processing the digital component data signals into a single data signal (stage 760). The joint processing can be performed using the processor or the DSP. The processor and/or the DSP can perform joint processing instructions as previously described above with reference to FIGS. 2, 3, and 4. In some implementations, the joint processing of the digital component data signals includes joint polarization demultiplexing, joint clock recovery, joint carrier recovery, joint forward error correction, and joint nonlinear compensation.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A parallel optical transmitter comprising:
   an optical comb source configured to generate an optical carrier signal including a plurality of optical carriers having a plurality of respective wavelengths;
   a processor configured to receive a data signal and split it into a plurality of digital component data signals;
   a plurality of digital-to-analog converters (DACs) configured to receive the digital component data signals and convert them into a plurality of respective analog component data signals;
   a demultiplexer configured to receive and separate the optical carrier signal into its constituent optical carriers;
   a photonic integrated circuit (PIC) including a plurality of lumped Mach-Zehnder modulators configured to modulate each analog component data signal onto a respective optical carrier to generate a respective optical component data signal; and
   a multiplexer configured to receive and combine the optical component data signals into a combined optical data signal.

2. The parallel optical transmitter of claim 1, wherein the PIC includes the demultiplexer and the multiplexer.

3. The parallel optical transmitter of claim 1, wherein the plurality of optical carriers generated by the optical comb source are phase locked with respect to each other.

4. The parallel optical transmitter of claim 1, wherein:
   the processor includes the DACs, and
   the DACs in the processor directly drive their respective modulator.

5. The parallel optical transmitter of claim 1, wherein the modulators are dual polarization Mach-Zehnder interferometers.

6. A method of transmitting an optical signal comprising:
   generating, using an optical comb source, an optical carrier signal including a plurality of optical carriers having a plurality of respective wavelengths;
   splitting, using a processor, a received data signal into a plurality of digital component data signals;
   converting, using a plurality of digital-to-analog converters (DACs), the digital component data signals into a plurality of respective analog component data signals;
   separating, using a demultiplexer, the optical carrier signal into its constituent optical carriers;
   modulating, using a plurality of lumped Mach-Zehnder modulators on a photonic integrated circuit (PIC), each analog component data signal onto a respective optical carrier to generate a respective optical component data signal; and
   combining, using a multiplexer, the optical component data signals into a combined optical data signal.

7. The method of claim 6, wherein the PIC includes the demultiplexer and the multiplexer.

8. The method of claim 6, wherein the plurality of optical carriers generated by the optical comb source are phase locked with respect to each other.

9. The method of claim 6, wherein:
   the processor includes the DACs, and
   the DACs in the processor directly drive their respective modulator.

10. The method of claim 6, wherein the modulators are dual polarization Mach-Zehnder interferometers.

11. A parallel optical receiver comprising:
    an optical comb source configured to generate an optical carrier signal including a plurality of optical carriers having a plurality of respective wavelengths;
    a first demultiplexer configured to receive and separate the optical carrier signal into its constituent optical carriers;
    a second demultiplexer configured to receive and separate a combined optical data signal into a plurality of optical component data signals;
    a photonic integrated circuit (PIC) including a plurality of coherent optical receivers configured to extract an analog component data signal from each optical component data signal;
    a plurality of analog-to-digital converters (ADCs) configured to receive the analog component data signals and convert them into a plurality of respective digital component data signals; and
    a processor configured to jointly process the digital component data signals into a single data signal, wherein jointly processing the digital component data signals includes joint carrier recovery.

12. The parallel optical receiver of claim 11, wherein the PIC includes the first demultiplexer and the second demultiplexer.

13. The parallel optical receiver of claim 11, wherein the PIC includes the first demultiplexer and the second demultiplexer the plurality of optical carriers generated by the optical comb source are phase locked with respect to each other.

14. The parallel optical receiver of claim 11, wherein each coherent optical receiver includes a dual polarization integrated coherent receiver having two 90-degree hybrids and a set of balanced photodiodes.

15. The parallel optical receiver of claim 11, wherein jointly processing the digital component data signals includes joint polarization demultiplexing, joint clock recovery, joint forward error correction, and joint nonlinear compensation.

16. A method of receiving an optical signal comprising:
    generating, using an optical comb source, an optical carrier signal including a plurality of optical carriers having a plurality of respective wavelengths;
    separating, using a first demultiplexer, the optical carrier signal into its constituent optical carriers;
    separating, using a second demultiplexer, a received combined optical data signal into a plurality of optical component data signals;
    extracting, using a plurality of coherent optical receivers on a photonic integrated circuit (PIC), an analog component data signal from each optical component data signal;
    converting, using a plurality of analog-to-digital converters (ADCs), the analog component data signals into a plurality of respective digital component data signals; and
    jointly processing, using a processor, the digital component data signals into a single data signal, wherein jointly processing the digital component data signals includes joint carrier recovery.

17. The method of claim 16, wherein the PIC includes the first demultiplexer and the second demultiplexer.

18. The method of claim 16, wherein the PIC includes the first demultiplexer and the second demultiplexer the plurality of optical carriers generated by the optical comb source are phase locked with respect to each other.

19. The method of claim 16, wherein each coherent optical receiver includes a dual polarization integrated coherent receiver having two 90-degree hybrids and a set of balanced photodiodes.

20. The method of claim 16, wherein jointly processing the digital component data signals includes joint polarization demultiplexing, joint clock recovery, joint forward error correction, and joint nonlinear compensation.

21. A parallel optical transponder comprising:
- a processor for joint processing of transmitted and received signals;
- an optical comb source configured to generate a first optical carrier signal including a first plurality of optical carriers at a plurality of respective wavelengths, and a second optical carrier signal including a second plurality of optical carriers at the plurality of respective wavelengths;
- a parallel optical transmitter including:
  - the processor configured to receive a first data signal and convert it into a first plurality of analog component data signals;
  - a first photonic integrated circuit (PIC) configured to receive and modulate a first optical carrier signal and the first plurality of analog component data signals to generate a first combined optical data signal; and
- a parallel optical receiver including:
  - a second photonic integrated circuit (PIC) configured to receive a second combined optical data signal and the second optical carrier signal, and extract a plurality of second analog component data signals; and
- the processor configured to jointly process the plurality of second analog component data signals into a second data signal, wherein jointly processing the digital component data signals includes joint carrier recovery.

* * * * *